Feb. 9, 1954    A. BOWLAND    2,668,558
GOGGLE VALVE
Filed March 21, 1950    2 Sheets-Sheet 2
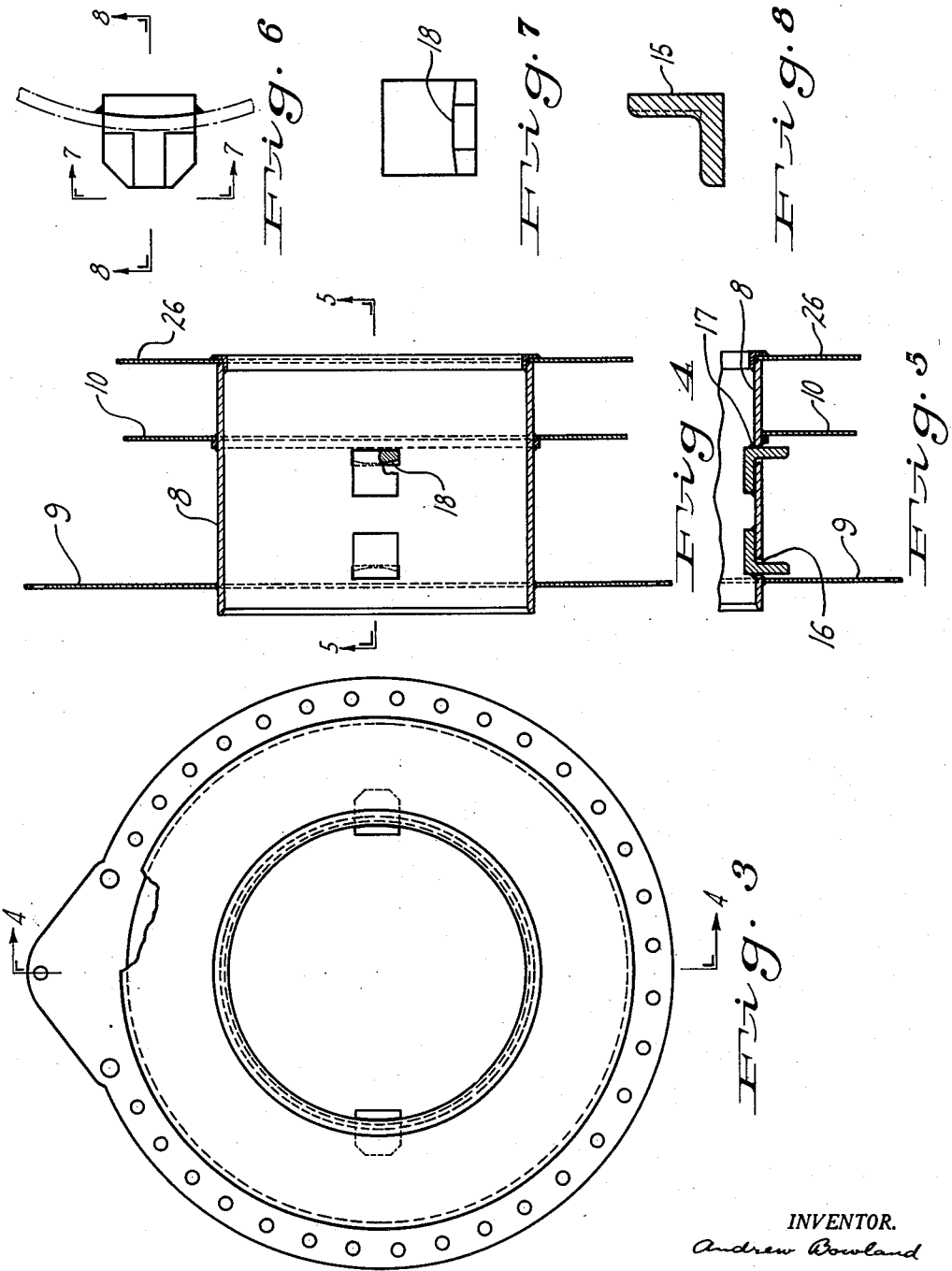
INVENTOR.
Andrew Bowland
BY William B. Jaspert
Attorney.

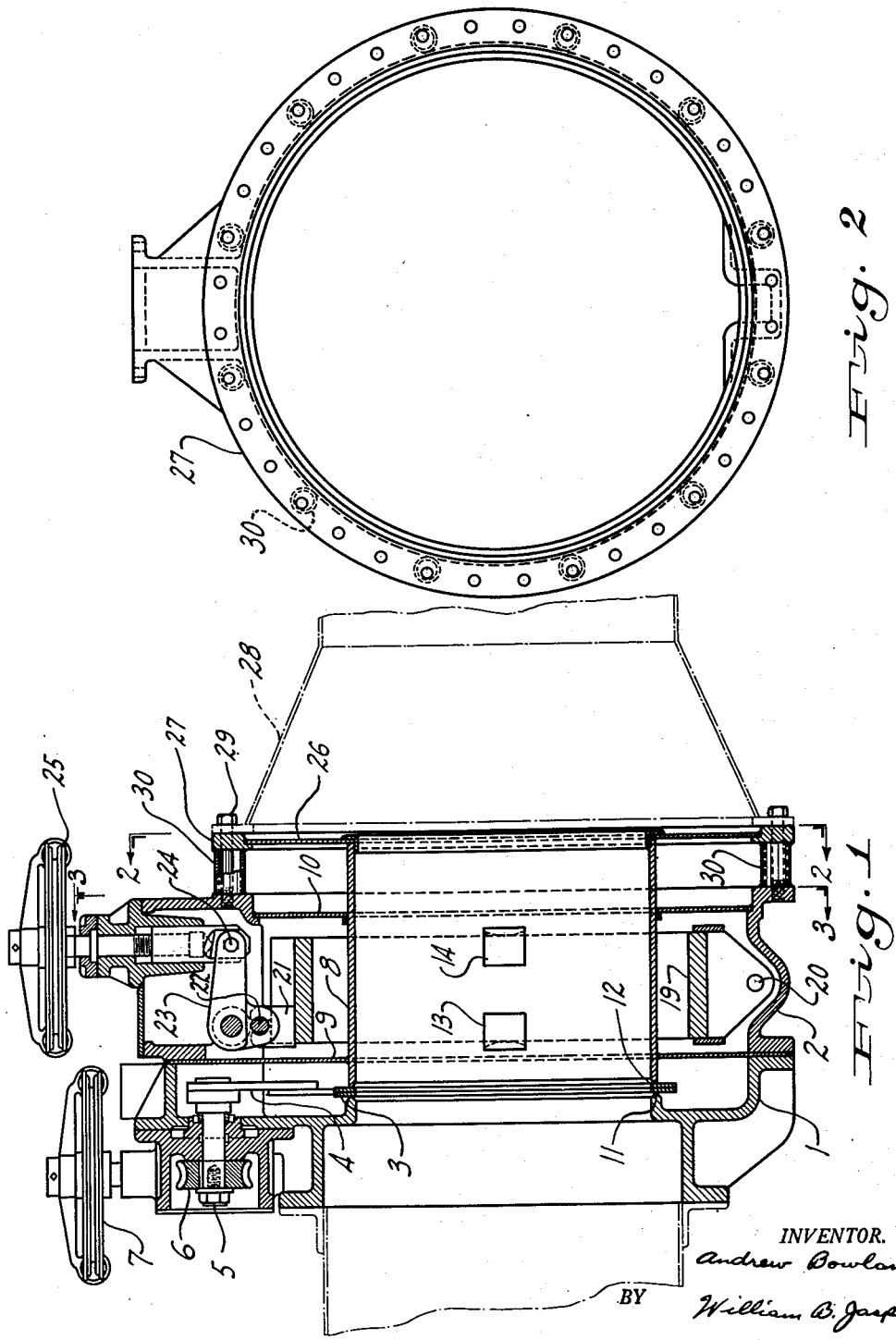

UNITED STATES PATENT OFFICE 2,668,558

GOGGLE VALVE

Andrew Bowland, Pittsburgh, Pa., assignor to William M. Bailey Company, Pittsburgh, Pa., a corporation of Pennsylvania Application March 21, 1950, Serial No. 150,907

2 Claims. (Cl. 138—94.5)

This invention relates to new and useful improvements in goggle valve structures, and it is among the objects thereof to provide a goggle valve in which the valve is sealed by a clamping ring that is mounted for movement to engage the valve in its closed position and to disengage the valve when it is desired to adjust the same.

In Patent No. 2,125,253, granted to me on July 26, 1938, there is described such a clamping ring construction employing diaphragm plates that are subjected to parallel motion in the clamping ring movements. In that structure the diaphragm plates are exposed to the hot gas main and are subjected to temperatures ranging from 800° to 1200° F. which causes them to crack and allow ingress of the hot gases to the operating mechanism.

In accordance with the present invention, the clamping plate is provided with an additional plate with an air space between to allow air cooling of the diaphragm plates and eliminate contact of the hot gases with the operating plates of the clamping ring.

The invention will become more apparent from a consideration of the accompanying drawings, constituting a part hereof, in which like reference characters designate like parts, and in which:

Fig. 1 is a vertical cross-sectional view of a goggle valve mechanism embodying the principles of this invention;

Fig. 2 an end elevational view thereof taken along the line 2—2, Fig. 1;

Fig. 3 an end elevational view of the valve housing and clamping ring taken along the line 3—3, in Fig. 1;

Fig. 4 a vertical section through the clamping ring and diaphragm plates taken along the line 4—4, Fig. 3;

Fig. 5 a cross section taken along the line 5—5, Fig. 4;

Fig. 6 a side elevational view of a lug secured to the clamping ring as by welding;

Fig. 7 an end elevational view taken along the line 7—7, Fig. 6; and

Fig. 8 a cross section taken along the line 8—8, Fig. 6.

With reference to the several figures of the drawing, numerals 1 and 2 designate a sectional valve housing between which is mounted a goggle valve plate 3 operated by a lever 4 connected to shaft 5 having a worm gear 6 actuated by a worm operated by a hand wheel 7 to subject the goggle valve 3 to angular movement. The section 2 houses a clamping ring 8 mounted by diaphragm plates 9 and 10 by which it is subjected to axial movement relative to the goggle valve 3. The casting of section 1 is provided with a reduced contact area 11 that engages the goggle valve plate 3 and the clamping ring 8 is provided with a similar reduced area 12 for engaging the plate 3 to seal the valve in its closed position, as shown in Fig. 1 of the drawings.

The clamping ring 8 is provided with guide lugs 13 and 14 which are mounted on the clamping ring in the manner shown in Figs. 4 to 8 inclusive of the drawings. They consist of angles 15 that extend through slots 16 in the clamping ring 8 and are secured thereto by welding as shown at 17, Fig. 5. The lugs are curved, as shown at 18, Fig. 4, to provide reduced contact areas for a yoke band 19, Fig. 1, that is pivoted to section 2 of the housing at 20, Fig. 1. The yoke band 19 is provided with an arm 21 having a pin 22 that is engaged by a yoke shaped end of a bell-crank lever 23 connected by pin 24 to an operating mechanism actuated by hand wheel 25, which causes the yoke band 19 to rock on its pivot 20 and, by virtue of its engagement as shown in dotted lines in Fig. 1 with the lugs 13 and 14, causes the clamping ring to move axially in the direction away from goggle plate 3.

The structure thus described is similar to that disclosed in my above-referred to Letters Patent, and the improvement to which the instant application is directed consists of a third diaphragm plate 26, Fig. 1, which is secured to the clamping ring 8 as shown in Fig. 4 of the drawings. This clamping plate is mounted on a ring 27 which is bolted to the gas main shown in dotted lines at 28, the diaphragm plate 26 being exposed to the hot gases in the main 28.

Ring 27 is connected to the valve section 2 by means of bolts 29 and is spaced therefrom by spools 30, leaving an open air space between the diaphragm plates 10 and 26 for the circulation of air therebetween. The additional diaphragm plate 26 does not interfere with the movements of the clamping ring 8 when operated by the yoke band 19. At the same time it eliminates the possibilities of the plate 10 cracking, since it is air cooled and not exposed to the hot gases of the main 28. Also, the diaphragm plate 26 is air cooled through the space between the spools, so that it will not be raised to the temperatures of the gases in the main 28 as was the case in the old construction where the plate 10 was exposed to the gas main and had no cooling surface since the space between the diaphragm plates 9 and 10 is a dead air space.

It is evident from the above description of the invention that goggle valve mechanisms employing clamping rings with diaphragm plates may be protected from overheating by the utilization of a spacer plate that permits circulation of air between the diaphragm plates. It prevents the ingress of dirt to the operating mechanism and eliminates cracking of the diaphragm plates.

Although one embodiment of the invention has been herein illustrated and described, it will be evident to those skilled in the art that various modifications may be made in the details of construction without departing from the principles herein set forth.

I claim:

1. In a goggle valve mechanism, a valve housing having a flow passage, a goggle valve movable to control the flow in said passage, a clamping ring forming a portion of said passage mounted for movement in an axial direction for engaging said goggle valve, said clamping ring constituting a hollow cylinder having a pair of diaphragm plates by which it is centered in the flow passage, a lever engaging said clamping ring for subjecting it to axial movement by flexing said diaphragm plates, and a third diaphragm plate mounted on one end of said clamping ring having a flange ring for receiving bolts for clamping the said plate to a gas main and to the valve housing in spaced relation from the latter, said connecting bolts having spacer spools therearound to provide for the rigid clamping of the third-named diaphragm plate with the housing wall and permit circulation of cooling air between said third diaphragm plate and the next adjacent plate.

2. In a goggle valve mechanism, a valve housing having a flow passage, a goggle valve movable to control the flow in said passage, a clamping ring forming a portion of said passage mounted for movement in an axial direction for engaging said goggle valve, said clamping ring constituting a hollow cylinder having a plurality of diaphragm plates by which it is centered in the flow passage, and a lever engaging said clamping ring for subjecting it to axial movement by flexing said diaphragm plates, a third diaphragm plate adjacent one of said clamping ring plates, said third plate having means for attachment to a gas main, said means including angularly spaced bolts and spacer spools on said bolts to space the diaphragm plate from the clamping ring diaphragm plate to provide for the circulation of air through said spools and between said plates.

ANDREW BOWLAND.

References Cited in the file of this patent

UNITED STATES PATENTS

| Number | Name | Date |
|---|---|---|
| 1,334,248 | Kling | Mar. 16, 1920 |
| 1,951,677 | Rosener | Mar. 20, 1934 |
| 2,079,896 | Brosius | May 11, 1937 |
| 2,125,253 | Bowland | July 26, 1938 |
| 2,229,165 | Bowland | Jan. 21, 1941 |